(12) United States Patent
Abels

(10) Patent No.: US 6,749,360 B2
(45) Date of Patent: Jun. 15, 2004

(54) AUTOMOBILE COMPONENT

(75) Inventor: Olaf Abels, Belm (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 0 days.

(21) Appl. No.: 09/913,382

(22) PCT Filed: Dec. 15, 2000

(86) PCT No.: PCT/DE00/04480

§ 371 (c)(1),
(2), (4) Date: Aug. 9, 2001

(87) PCT Pub. No.: WO01/44002

PCT Pub. Date: Jun. 21, 2001

(65) Prior Publication Data

US 2002/0136592 A1 Sep. 26, 2002

(30) Foreign Application Priority Data

Dec. 17, 1999 (DE) .......................... 199 61 425

(51) Int. Cl.[7] .............................................. B60G 3/04
(52) U.S. Cl. ..................... 403/381; 403/294; 403/270; 403/364; 280/124.134
(58) Field of Search ................. 403/270, 294, 403/364, 381, 315–317, 326, 327, 331, 339, 340, 345, 353, 363; 280/124.134, 781

(56) References Cited

U.S. PATENT DOCUMENTS

| 115,583 | A | * | 6/1871 | Dann et al. ................... 296/29 |
|---|---|---|---|---|
| 1,439,002 | A | * | 12/1922 | Jourdan ....................... 403/364 |
| 1,700,477 | A | * | 1/1929 | Goode ......................... 280/796 |
| 2,577,120 | A | * | 12/1951 | Franz ....................... 211/85.18 |
| 3,392,848 | A | * | 7/1968 | McConnel et al. ......... 211/192 |
| 3,825,360 | A | * | 7/1974 | Galich ........................ 403/294 |
| 4,053,246 | A | * | 10/1977 | Uccello ....................... 403/233 |
| 4,147,379 | A | * | 4/1979 | Winslow ..................... 280/781 |
| 4,189,250 | A | * | 2/1980 | Abbott et al. ............... 403/190 |
| 4,341,486 | A | * | 7/1982 | Hammerschlag ............ 403/252 |
| 4,351,312 | A | * | 9/1982 | Ivy ............................. 126/30 |
| 4,767,740 | A | * | 8/1988 | Abthoff et al. ............. 502/439 |
| 5,161,268 | A | * | 11/1992 | Harrow ......................... 5/201 |
| 5,398,411 | A | * | 3/1995 | Kasuka et al. ............. 29/897.2 |
| 5,762,440 | A | * | 6/1998 | Bedouch ..................... 403/373 |
| 5,848,854 | A | * | 12/1998 | Brackett ..................... 403/237 |
| 6,189,930 | B1 | * | 2/2001 | Kalazny ...................... 280/781 |
| 6,220,779 | B1 | * | 4/2001 | Warner et al. .............. 403/381 |
| 6,354,543 | B1 | * | 3/2002 | Paske ........................ 248/68.1 |
| 6,398,260 | B1 | * | 6/2002 | Rinchart ..................... 280/781 |

FOREIGN PATENT DOCUMENTS

| EP | 0 712 741 | | 5/1996 | | |
|---|---|---|---|---|---|
| EP | 0 713 791 | | 5/1996 | | |
| JP | 402199400 A | * | 8/1990 | ................. | 280/781 |
| JP | 5-185171 | | 7/1993 | | |
| JP | 405319302 A | * | 12/1993 | ................. | 280/781 |
| JP | 9-286217 | | 11/1997 | | |
| JP | 10-35235 | | 2/1998 | | |
| JP | 10-324123 | | 12/1998 | | |
| JP | 11-99415 | | 4/1999 | | |
| JP | 11-101286 | | 4/1999 | | |

* cited by examiner

Primary Examiner—Robert J. Sandy
Assistant Examiner—Ruth C. Rodriguez
(74) Attorney, Agent, or Firm—McGlew and Tuttle, P.C.

(57) ABSTRACT

An apparatus and method for motor vehicle suspension arms or subframes is provided. A motor vehicle apparatus and method is used with frame components. The motor vehicle component includes frame parts of lightweight design that have complementary profiles that can be inserted one another to create a locking connection between the frame parts. The invention frame parts may be designed as extruded profiles. The motor vehicle component allows for the individual frame parts to be manufactured separately from one another and combined wherein the number and cross section of the stiffening ribs are selectable in a load dependant way in the form a modular system and different materials may be used for individual components.

26 Claims, 5 Drawing Sheets

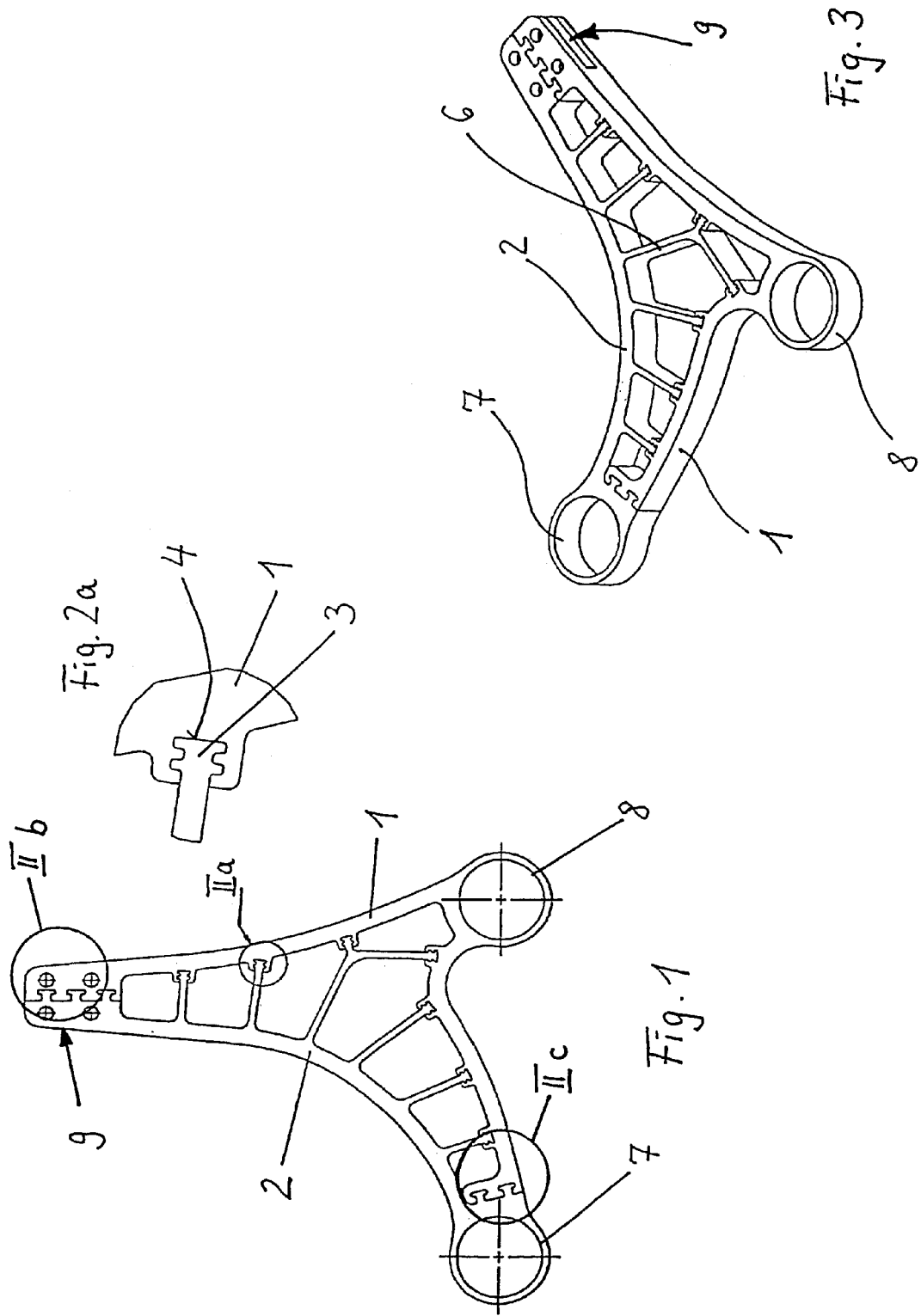

AUTOMOBILE COMPONENT

FIELD OF THE INVENTION

The present invention pertains to a motor vehicle component as it can be used, e.g., for suspension arms or also subframes.

BACKGROUND OF THE INVENTION

The need to save fossil fuels, which also include fuels for motor vehicles, is necessary not only for environmental reasons but for economic reasons as well in order to take measures in light of the dwindling resources and the accompanying increase in the cost of these energy sources.

One possibility of saving fuel in the automobile industry is, e.g., to design vehicles with reduced weight. Components with the lowest possible own weight are therefore increasingly used. One possible solution is to use alternative materials, such as aluminum or magnesium, for the motor vehicle components instead of the usual steel design variants.

The necessary safety requirements must, of course, be nevertheless met, which actually appears to be conflicting in the case of the use of these materials. One way out is sandwich components with foam cores or latticework designs.

Forging methods, which are comparatively expensive and also have the drawback that, e.g., flat designs with thin wall thicknesses and latticework constructions can be manufactured with an unusually great effort only, are frequently used to manufacture of the motor vehicle components from aluminum or magnesium.

Moreover, suspension arms, which consist of an extruded latticework construction, have been known in the manufacture of motor vehicles. However, these embodiments have the drawback that the cores necessary for manufacturing the hollow bodies must be held by webs. The webs leave behind extrusion seams in the structure of the suspension arm. Such extrusion seams imply the risk of defects in the structure, which can be identified at an unusually great quality testing effort only. For example, a nondestructive material testing (ultrasonic testing) can be used for this purpose, which is, however, time-consuming and therefore expensive in the manufacturing process. If these tests are not performed on each component, the possible defects in the extrusion seams imply safety risks, which are not acceptable for safety-critical components in the manufacture of motor vehicles.

SUMMARY AND OBJECTS OF THE INVENTION

The basic technical object of the present invention is to provide motor vehicle components which can be manufactured at a low effort in terms of material and nevertheless meet the necessary safety requirements.

Thus, a motor vehicle component according to the present invention comprises at least two frame parts, which have a plurality of profiles that are complementary to one another and can be inserted into one another for establishing a positive-locking connection of the frame parts.

The decisive advantage of the solution according to the present invention is consequently that the individual frame parts can be produced separately from one another and optionally according to different manufacturing methods in order to be subsequently united, which can be carried out, e.g., by means of a single plug-type or snap-in connection.

As a consequence of their positive-locking connection, after treatment of the frame parts can be eliminated. Any desired profile design is conceivable. Furthermore, a latticework construction can be implemented, which advantageously accommodates the requirement for lightweight construction.

Thus, in a variant of the idea of the present invention, it is proposed that the frame parts be designed as extruded profiles of lightweight design. The extrusion method is a highly economical manufacturing method with which the motor vehicle components can also be manufactured in large series.

In addition, it is advantageous to design the mutually complementary profiles as guides, which may be flat guides, dovetail guides, prismatic guides or the like. A press fit is available for connecting the profiles detachably to one another, so that a first seating is achieved already when the frame parts are fitted into one another. The press fit comprises, in the known manner, a fitted connection, in which a slightly undersized component accommodates an oversized one.

Other connection methods may, of course, be used as well. These include, e.g., welding, bonding or a partial material deformation in the area of the profiles engaging one another.

Furthermore, securing the connection of the two frame parts against one another in the area of the profiles that can be inserted into one another by means of a clamp is also within the scope of the inventive idea. This clamp is pushed over the corresponding parts after the fitting together of the frame parts and may be secured or fixed itself.

Corresponding to the stated object of manufacturing a motor vehicle component that meets the highest safety requirements, it is proposed according to another embodiment of the present invention that stiffening ribs in the form of a latticework structure be provided between the frame parts. The stiffening ribs may be made directly in one piece with individual frame parts or be subsequently inserted into the frame parts that had already been fitted into one another. Manufacturing the motor vehicle component in the form of a modular system is particularly advantageous in this connection, in which case the stiffening ribs may have wall thicknesses differing depending on the load and consist of, e.g., different materials. The number of stiffening ribs may thus vary for the individual applications of the motor vehicle components according to the present invention.

Moreover, it is advantageous to manufacture the motor vehicle component as a whole or in part from aluminum or magnesium or plastic, and a connection of a plurality of types of material is, of course, within the scope of the idea of the invention. For example, it would be conceivable to manufacture the frame parts from extruded aluminum profiles and to fit stiffening ribs made of plastic between these frame parts.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 shows a top view of a suspension arm for a motor vehicle,

FIG. 2a shows an enlarged detail of a part of the suspension arm corresponding to detailed marked by II-a in FIG. 1, FIG. 3 shows a three-dimensional view of a suspension arm for a motor vehicle.

DESCRIPTION OF THE PREFERRED EMBODIMENT

Figure 2B:
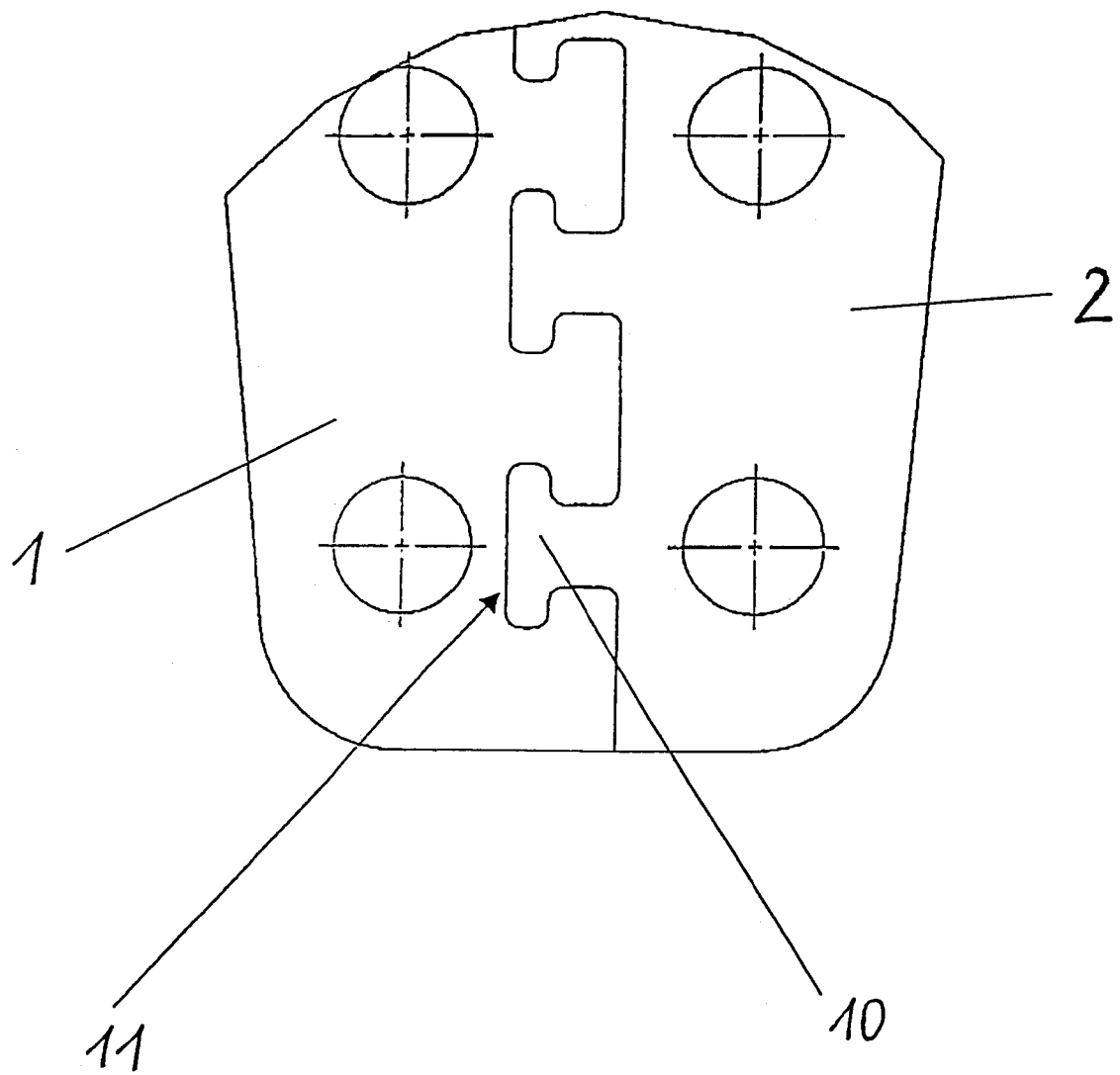
FIG. 2b shows an enlarged detail of a part of the suspension arm corresponding to the detail marked by II-b in FIG. 1.

Referring to the drawings in particular, the figures show as examples embodiments of motor vehicle components according to the present invention as they may be used especially as suspension arms for the wheel suspension of motor vehicles. The suspension arm designs shown are manufactured as lightweight extruded aluminum profiles.

Figure 2C:
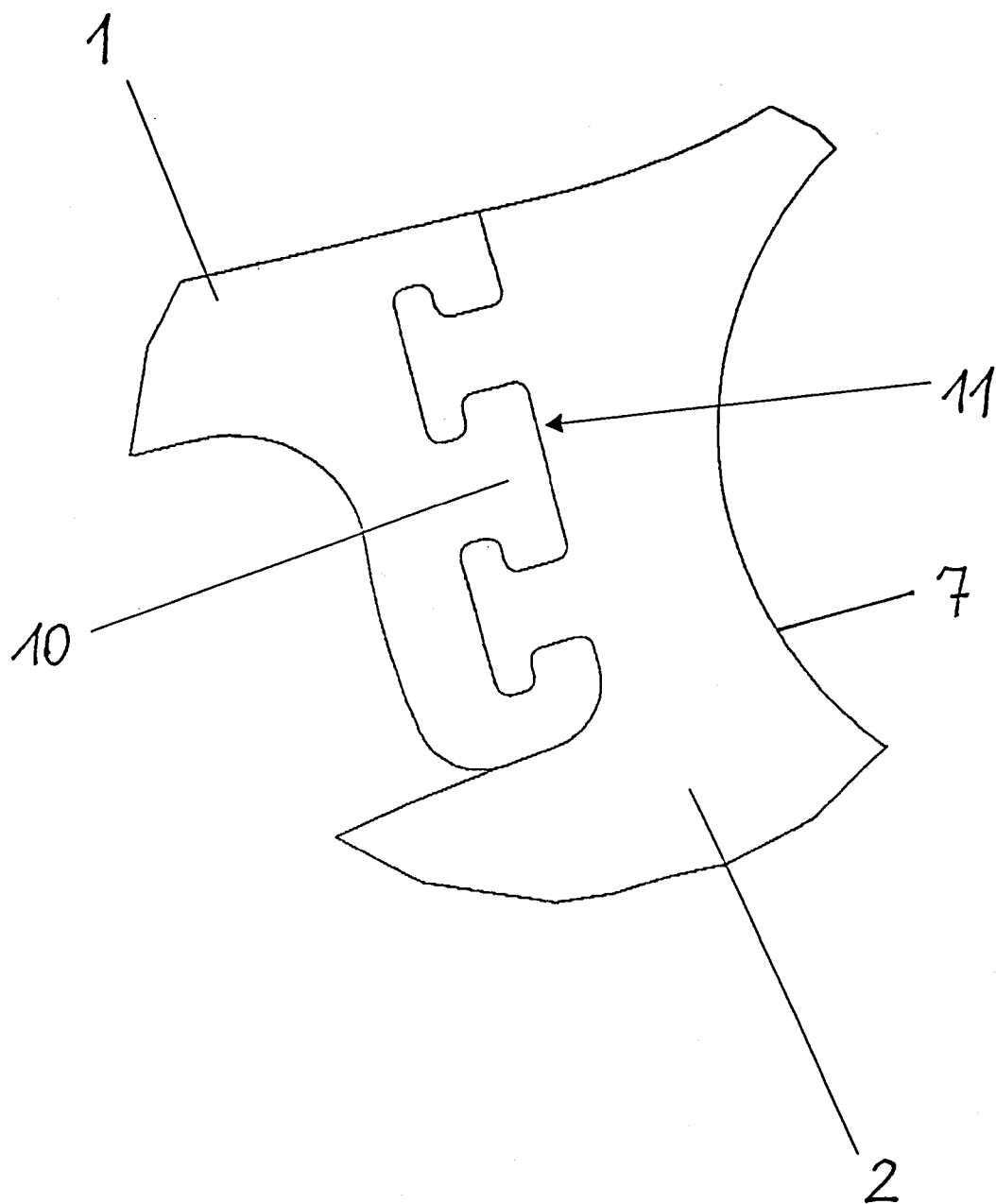
FIG. 2c shows an enlarged detail of a part of the suspension arm corresponding to the detail marked by II-c in FIG. 1.

In FIGS. 1 through 3, the suspension arms comprise two frame parts 1 and 2, with which openings 7 and 8 for receiving additional motor vehicle components (e.g., ball-and-socket joints) are made in one piece. Furthermore, a connection 9 is provided in the frame parts 1 and 2 on the side located opposite the openings. The frame parts 1 and 2 have numerous mutually complementary profiles 3, 4, 10 and 11, which can be inserted into one another and form a positive-locking connection. A profile which has the shape of a T and is inserted into a fitting recess 11 is designated by 10. The connection of the profiles 3, 4, 10 and 11 is shown in an enlarged view in FIGS. 2a, 2b and 2c.

In addition, a plurality of stiffening ribs 6 are made in one piece with the frame part 2. As is clearly apparent from FIG. 2a, a clamp-like profile 3 is made in one piece with the stiffening rib 6 in the end area of these stiffening ribs 6. This profile is inserted into a complementary mount 4 provided for this purpose in the frame part 1 during the fitting together of the frame parts 1 and 2.

In the embodiment shown, the profile 3 has the shape of a double T, which is mounted in the corresponding mount 4. A respective press fit was selected between the profiles 3, 4, 10 and 11 for the positive-locking connection. The profiles 10, 11 of the frame parts 1 and 2 are connected to one another in the area of the connection 9 as well as at least one of the openings 7 and 8, respectively, as is apparent from FIGS. 2b and 2c.

Figure 5:
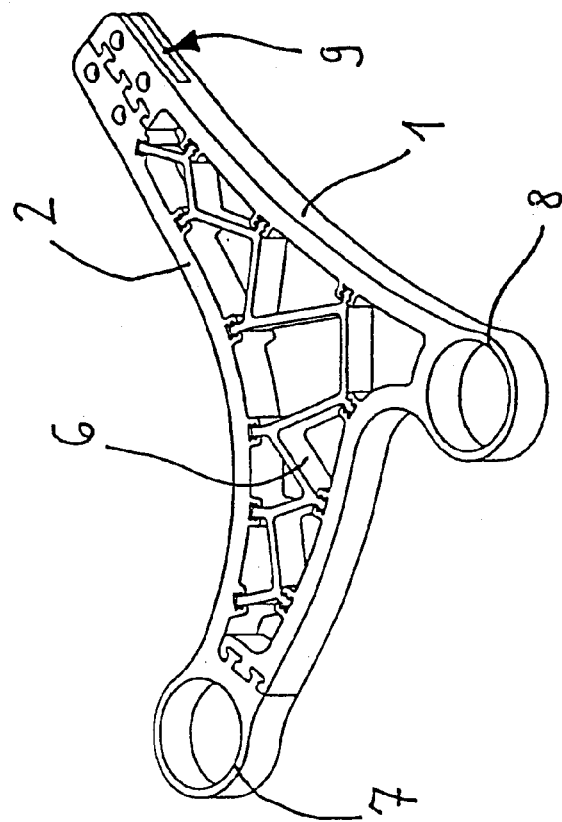
FIG. 5 shows a three-dimensional view of a suspension arm corresponding to the embodiment in FIG. 4.
Figure 4:
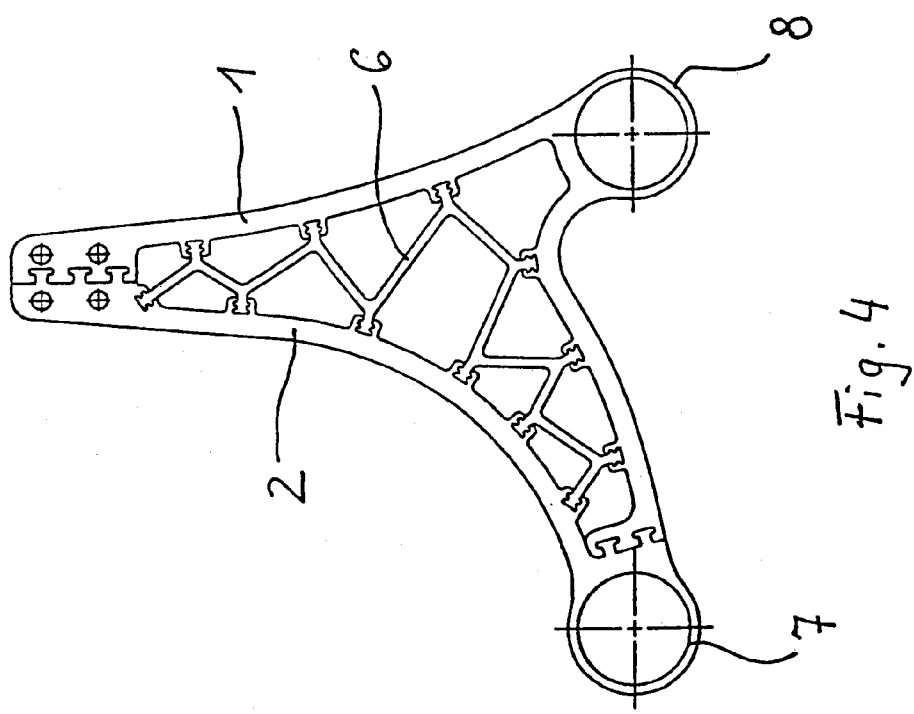
FIG. 4 shows another embodiment variant of a suspension arm for a motor vehicle.
Figure 6:
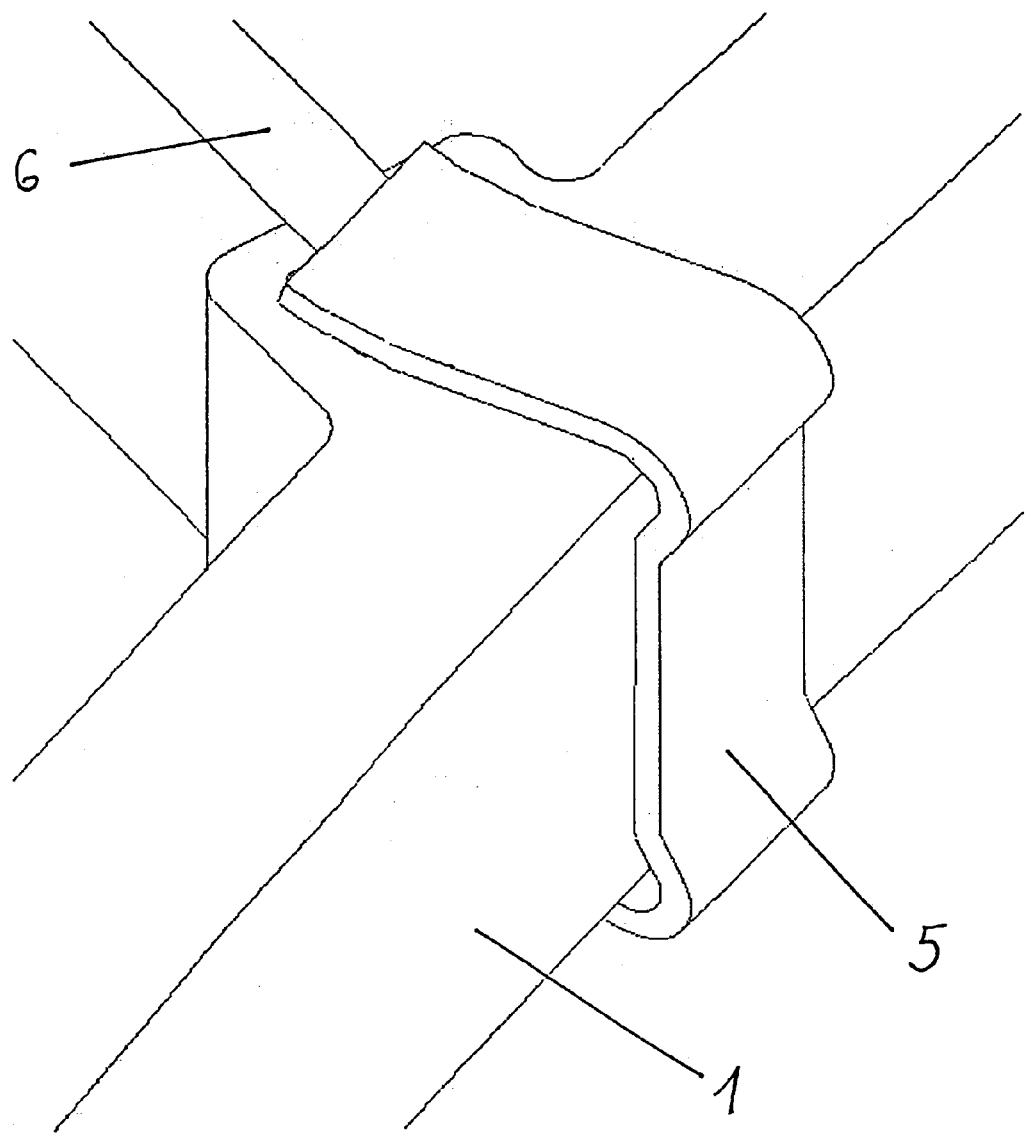
FIG. 6 shows an enlarged detail of a possibility of fastening of the frame parts.

FIGS. 4 and 5 show another design variant of a suspension arm of lightweight design for a motor vehicle. FIG. 4 shows a top view and FIG. 5 shows a three-dimensional view. The suspension arm shown for a motor vehicle comprises here two frame parts 1 and 2 with the above-described openings 7 and 8 for connecting the suspension arm to the wheel suspension parts of the motor vehicle as well as a connection area 9, which is arranged opposite the openings 7 and 8. The frame parts 1 and 2 engage one another via a T-shaped profile connection 10, 11. This positive-locking connection between the frame parts 1 and 2 is located in the area of the opening 7, on the one hand, and in the area of the connection 9, on the other hand.

In addition, both frame parts 1 and 2 have a plurality of mounts 4 distributed over their inner circumference. Stiffening ribs 6, whose end-side profile 3 engages the mounts 4 in a positive-locking manner, are inserted into these mounts 4. A press fit may be used in the above-described manner in this case as well for the firmly seated connection between the stiffening ribs 6 and the mounts 4 of the frame parts 1 and 2. The design of a motor vehicle component according to the view in FIGS. 4 and 5 permits variable shapes. Thus, the number of stiffening ribs 6 may vary corresponding to the requirements imposed. A structure of stiffening ribs 6, which is closed in itself, was placed between the frame parts 1 and 2 in the exemplary embodiment shown in FIGS. 4 and 5. It is, of course, also possible to insert a plurality of individual stiffening ribs between the frame parts 1 and 2, so that there is a great freedom of design here.

The view in FIG. 5 shows once again a possible embodiment of the securing of the individual parts of a motor vehicle component according to the present invention. A clamp 5 was placed on the frame part 1, which is shown as a detail here, over the stiffening ribs 6 in the area of the profiles 3 and 4 engaging one another in a complementary manner. Such a clamp may also be used for a support to hold together the components to be fitted into one another.

The described connection of the frame parts according to the present invention makes possible a very simple possibility of monitoring for detecting defects in terms of manufacturing technology, so that a maximum quality standard can be attained and ensured. The motor vehicle components according to the present invention are weight-optimized and nevertheless meet the safety requirements imposed on them, such as stability and strength or torsional rigidity. They can be used in a flexible manner, because the strength can be varied as desired by the additional or subsequent insertion of stiffening ribs. The motor vehicle components according to the present invention can thus be manufactured at a very reasonable cost and in a simple manner.

While specific embodiments of the invention have been shown and described in detail to illustrate the application of the principles of the invention, it will be understood that the invention may be embodied otherwise without departing from such principles.

What is claimed is:

1. A motor vehicle component comprising:

a frame part;

another frame part, said frame parts each having a plurality of complementary profiles that can be inserted into one another for establishing a positive-locking connection of said frame parts, said complementary profiles include guides including one of flat guides, dovetail guides or prismatic guides, said first frame part having a shape cooperating with a shape of said second frame part to form a motor vehicle suspension arm, with said frame parts in said positive locking connection; and a clamp, said frame parts being braced against one another by means of said clamp arranged on and around two of said plurality of complementary profiles with one of said two profiles engaging the other.

2. A motor vehicle component in accordance with claim 1, wherein said frame parts are extruded profiles of lightweight design.

3. A motor vehicle component in accordance with claim 1, wherein said profiles have a securing means against spontaneous separation, which is prepared by one or more of welding, bonding, partial material deformation or a press fit.

4. A motor vehicle component in accordance with claim 1, wherein the motor vehicle component consists at least partly of one or more of magnesium, aluminum and plastic.

5. A motor vehicle component comprising:

a first frame part;

a second frame part, said first and second frame parts having a shape to form a suspension arm for a motor vehicle;

a frame protruding portion with a profile, said frame protruding portion being connected to one of said first frame part and said second frame part;

a frame recess portion with a profile, said frame recess portion being connected to the other of said first frame part and said second frame part, said frame protruding portion being inserted into said frame recess portion, said frame protruding portion profile and said frame recess portion profile being complementary for establishing a positive-locking complementary connection as to two orthogonal directions for maintaining a connection of said first frame part and said second frame part to prevent disconnection of said first frame part and said second frame part with respect to said two orthogonal directions with said frame protruding portion inserted into said frame recess portion;

another frame protruding portion with a profile, said another frame protruding portion being connected to one of said first frame part and said second frame part;

another frame recess portion with a profile, said another frame recess portion being connected to the other of said first frame part and said second frame part, said another frame protruding portion being inserted into said another frame recess portion, said another frame protruding portion profile and said another frame recess portion profile being complementary for establishing a positive-locking complementary connection as to two orthogonal directions for maintaining a connection of said first frame part and said second frame part to prevent disconnection of said first frame part and said second frame part with respect to said two orthogonal directions with said another frame protruding portion inserted into said another frame recess portion.

6. A motor vehicle component in accordance with claim 5, wherein said frame parts are extruded profiles.

7. A motor vehicle component in accordance with claim 5, wherein said profile of said frame protruding portion and said another frame protruding portion are one of flat surfaced, dovetail shaped and prismatic shaped.

8. A motor vehicle component in accordance with claim 7, wherein said profile of said frame receiving portion and said another frame receiving portion is one of flat surfaced guide, a dovetail shaped guide and a prismatic shaped guide.

9. A motor vehicle component in accordance with claim 8, wherein said profiles have a securing means against spontaneous separation, which is prepared by one or more of welding, bonding, partial material deformation or a press fit.

10. A motor vehicle component in accordance with claim 8, wherein said frame parts are braced against one another by means of a clamp arranged on and around said frame protruding portion and said frame receiving portion which engage each other.

11. A motor vehicle component in accordance with claim 8, further comprising stiffening ribs in the form of a latticework structure inserted between said frame parts, said stiffening ribs having protruding portions, each stiffening rib protruding portion having a profile, and each of said first frame part and said second frame part having a stiffening member recess portion with a complementary profile for forming a positive-locking complementary connection.

12. A motor vehicle component in accordance with claim 11, wherein the number as well as the cross section of said stiffening ribs are freely selectable in a load-dependent manner in the form of a modular system and different materials can be used for the individual components.

13. A motor vehicle component in accordance with claim 5, wherein the motor vehicle component consists at least partly of one or more of magnesium, aluminum and plastic.

14. A motor vehicle component in accordance with claim 5, wherein each of said frame protruding portion and said another frame protruding portion have an outer peripheral surface with a normal direction that changes by more than one hundred and eighty degrees over a peripheral extent of said peripheral surface.

15. A component in accordance with claim 5, wherein:

said frame parts define openings for receiving addition motor vehicle components.

16. A motor vehicle component comprising:

a first frame part;

a second frame part;

a frame protruding portion with a profile, said frame protruding portion being connected to one of said first frame part and said second frame part;

a frame recess portion with a profile, said frame recess portion being connected to the other of said first frame part and said second frame part, said frame protruding portion being inserted into said frame recess portion, said frame protruding portion profile and said frame recess portion profile being complementary for establishing a positive-locking complementary connection as to two orthogonal directions for maintaining a connection of said first frame part and said second frame part to prevent disconnection of said first frame part and said second frame part with respect to said two orthogonal directions with said frame protruding portion inserted into said frame recess portion;

another frame protruding portion with a profile said another frame protruding portion being connected to one of said first frame part and said second frame part;

another frame recess portion with a profile, said another frame recess portion being connected to the other of said first frame part and said second frame part, said another frame protruding portion being inserted into said another frame recess portion, said another frame protruding portion profile and said another frame recess portion profile being complementary for establishing a positive-locking complementary connection as to two orthogonal directions for maintaining a connection of said first frame part and said second frame part to prevent disconnection of said first frame part and said second frame part with respect to said two orthogonal directions with said another frame protruding portion inserted into said another frame recess portion, said first frame part having a shape cooperating with a shape of said second frame part to form a motor vehicle suspension arm, with said frame parts in said positive locking—complementary connection.

17. A motor vehicle component comprising:

a frame part;

another frame part;

a plurality of frame profile pairs connecting said frame parts, each of said frame profile pairs having a first profile part and second profile part complementary to said first profile part, said second profile part being receivable of said first profile part to lock said first profile part in said second profile part, one of said first profile part and said second profile part being arranged on one of said frame part and said another frame part;

a plurality of stiffening ribs in the form of a latticework structure arranged between said frame parts;

a plurality of rib profile pair connecting said ribs to said frame parts, each of said rib profile pairs having a first profile part and second profile part complementary to said first profile part, said second profile part of said rib profile pairs being receivable of said first profile part to lock said first profile part in said second profile part, said second profile part of one of said rib profile pain being arranged on one of said frame part and said another frame part, said first profile part of said one rib profile pair being arranged on one of said plurality of stiffening ribs.

18. A motor vehicle component in accordance with claim 17, wherein the number as well as the cross section of said stiffening ribs are freely selectable in a load-dependent manner in the form of a modular system and different materials can be used for the individual components.

19. A component in accordance with claim 17, wherein:
said second profile parts of said rib profile pairs are arranged on both said frame parts.

20. A component in accordance with claim 17, wherein:
said frame parts and said plurality of stiffening ribs are shaped to form a suspension arm of a motor vehicle.

21. A component in accordance with claim 20, wherein:
said frame parts define openings for receiving ball and socket joints of the motor vehicle.

22. A component in accordance with claim 17, wherein:
said frame pans define openings for receiving addition motor vehicle components.

23. A component in accordance with claim 17, wherein:
said first profile parts of said frame and rib profile pairs are oversized with respect to said second parts, said first and second profile parts being press fit together.

24. A motor vehicle component comprising:
a frame part;

another frame part, said frame parts having a plurality of complementary profiles that can be inserted into one another for establishing a positive-locking connection of said frame parts, said complementary profiles include guides including one of flat guides, dovetail guides or prismatic guides, said frame parts are braced against one another by means of a clamp;

one part of said complementary profiles are oversized with respect to another part of said complementary profiles, said one and another complementary profile parts being press fit together, said first frame part having a shape cooperating with a shape of said second frame part to form a motor vehicle suspension arm, with said first frame part connected to said second frame part by said press fit.

25. A motor vehicle component comprising:
a frame part;

another frame part, said frame parts having a plurality of complementary profiles that can be inserted into one another for establishing a positive-locking connection of said frame parts, said complementary profiles include guides including one of flat guides, dovetail guides or prismatic guides, said frame parts are braced against one another by means of a clamp;

stiffening ribs in the form of a latticework structure inserted between said frame parts.

26. A motor vehicle component comprising:
a first frame part;

a second frame part;

a frame protruding portion with a profile, said frame protruding portion being connected to one of said first frame part and said second frame part;

a frame recess portion with a profile, said frame recess portion being connected to the other of said first frame part and said second frame part, said frame protruding portion being inserted into said frame recess portion, said frame protruding portion profile and said frame recess portion profile being complementary for establishing a positive-locking complementary connection as to two orthogonal directions for maintaining a connection of said first frame part and said second frame part to prevent disconnection of said first frame part and said second frame part with respect to said two orthogonal directions with said frame protruding portion inserted into said frame recess portion;

another frame protruding portion with a profile, said another frame protruding portion being connected to one of said first frame part and said second frame part;

another frame recess portion with a profile, said another frame recess portion being connected to the other of said first frame part and said second frame part, said another frame protruding portion being inserted into said another frame recess portion, said another frame protruding portion profile and said another frame recess portion profile being complementary for establishing a positive-locking complementary connection as to two orthogonal directions for maintaining a connection of said first frame part and said second frame part to prevent disconnection of said first frame part and said second frame part with respect to said two orthogonal directions with said another frame protruding portion inserted into said another frame recess portion;

stiffening ribs in the form of a latticework structure inserted between said frame parts.

* * * * *